United States Patent [19]

Ouhadi

[11] Patent Number: 5,609,962
[45] Date of Patent: Mar. 11, 1997

[54] METHOD TO ADHERE THERMOPLASTIC ELASTOMER BLENDS TO POLYESTER SUBSTRATES

[75] Inventor: Trazollah Ouhadi, Gloesener, Belgium

[73] Assignee: Advanced Elastomer Systems, L.P., Akron, Ohio

[21] Appl. No.: 573,709

[22] Filed: Dec. 18, 1995

[30] Foreign Application Priority Data

Dec. 24, 1994 [EP] European Pat. Off. ............ 94120649

[51] Int. Cl.⁶ .................. B32B 27/36; C09J 5/04
[52] U.S. Cl. .................. 428/480; 156/305; 156/314; 156/325; 156/330; 156/331.4; 156/331.7
[58] Field of Search .................. 427/207.1, 208; 156/117, 244.27, 305, 325, 331.4, 314, 330, 331.7; 428/480

[56] References Cited

U.S. PATENT DOCUMENTS

| | | | |
|---|---|---|---|
| Re. 30,006 | 5/1979 | Sakayori et al. | 427/375 |
| 2,911,321 | 11/1959 | Herrmann et al. | 117/76 |
| 3,037,954 | 6/1962 | Gessler et al. | |
| 3,503,845 | 3/1970 | Hollatz et al. | 161/184 |
| 3,642,553 | 2/1972 | Georges | 156/308 |
| 4,345,004 | 8/1982 | Miyata et al. | 428/416 |
| 4,732,632 | 3/1988 | Pieslak et al. | 156/86 |
| 4,916,180 | 4/1990 | Robinson et al. | 524/456 |

FOREIGN PATENT DOCUMENTS

| | | |
|---|---|---|
| 0286409 | 10/1988 | European Pat. Off. . |
| 0580076 | 1/1994 | European Pat. Off. . |

*Primary Examiner*—Daniel Zirker
*Attorney, Agent, or Firm*—William A. Skinner

[57] ABSTRACT

A method to adhere thermoplastic elastomer blends comprising
(a) at least one thermoplastic polyolefin,
(b) at least one non-cured, partially cured or fully cured elastomer or blends thereof,
(c) a functionalized polyolefin and
(d) optionally additives,
to a polyester substrate, said method comprising the steps of
treating the substrate with a blocked di-isocyanate in aqueous dispersion, or subsequently or simultaneously treating the substrate with a blocked di-isocyanate and an epoxy resin in aqueous dispersion/emulsion,
applying the thermoplastic elastomer blend to the treated substrate and bonding the thermoplastic elastomer blend to the surface of the substrate using heat and pressure.

The invention further relates to shaped articles obtainable by said process.

13 Claims, No Drawings

METHOD TO ADHERE THERMOPLASTIC ELASTOMER BLENDS TO POLYESTER SUBSTRATES

BACKGROUND OF THE INVENTION

Field of the Invention

This invention relates to a method to adhere thermoplastic elastomer blends to polyester substrates. The invention further relates to shaped articles obtainable by said method.

Polymer blends which have a combination of both thermoplastic and elastic properties (thermoplastic elastomers, TPE) are generally obtained by combining a thermoplastic polyolefin with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisobutene in an uncured matrix of thermoplastic polymer such as polypropylene.

The inherent characteristic of the polyolefinic thermoplastic elastomer blends like all the polyolefinic thermoplastic is its non-reactive surface and consequently should be modified with a polar material in order to be cohesively bondable to polar substrates.

Polyolefinic thermoplastic elastomer blends as well as polyolefinic materials like polyethylene, polypropylene due to their low surface tension (28–30 dyns/cm) cannot adhere directly to more polar substrates like polyamid, polyester, metal and glass.

Various techniques are used to increase the surface tension of polyolefinic materials like chemical surface treatment, compound modification via polar ingredients, surface oxidation or to reduce surface tension of polar substrates by using a primer/adhesive system.

U.S. Pat. No. 2,911,321 describes a method for bonding a polyolefin layer on polyester using an "anchoring agent" of isocyanate/blocked isocyanate, which is applied to the substrate as a dilute solution in organic solvent. The polyolefin is extruded onto the treated polyester substrate and bonded by heat and pressure.

U.S. Pat. No. 4,345,004 describes a method of forming an olefinic coating on a (metal) substrate by applying a multi-layer film of epoxy resin, olefinic resin and modified olefinic resin, then heat bonding an olefinic resin layer thereto.

U.S. Pat. No. 4,732,632 describes a method of coating a substrate by applying a liquid, curable polymer composed of resin (e.g. epoxy; polyurethane precursor) and curative (e.g. isocyanurate) to the substrate, then applying a layer of polymer (e.g. polyolefin, EPDM, butyl, etc.) which can interact chemically or physically with the curable first layer.

Certain adhesion between a thermoplastic elastomer like Santoprene® rubber and polyester, polyamide is obtainable by using some solvent-based primer/adhesive systems like Morprime P80 from Morton International or Chemlock 487 from Lord Corporation. But the level of adhesion, obtained with these systems is not high enough for certain applications in dynamic conditions like power transmission. Also, the use of solvent-based primer/adhesive systems become subject to legislative restrictions based on environmental protection. Consequently, the development of the water-based primer/adhesive systems is highly challenged by most adhesive specialists.

It has now surprisingly been found that a method making use of both, modified thermoplastic elastomers and the pretreatment of the surface of the substrate yields excellent adhesion.

In detail the present invention relates a method to adhere thermoplastic elastomer blends comprising (a) at least one thermoplastic polyolefin, (b) at least one non-cured, partially cured or fully cured elastomer or blends thereof, (c) a functionalized polyolefin and (d) optionally additives, to a polyester substrate, said method comprising the steps of treating the substrate with a blocked di-isocyanate in aqueous dispersion, or subsequently or simultaneously treating the substrate with a blocked di-isocyanate and an epoxy resin in aqueous dispersion/emulsion, applying the thermoplastic elastomer blend to the treated substrate and bonding the thermoplastic elastomer blend to the surface of the substrate using heat and pressure.

Alternatively the functionalized polyolefin (c) may be applied to the polyester substrate prior to applying the blend of (a), (b) and optionally (d) to said substrate.

DESCRIPTION OF THE PREFERRED EMBODIMENTS

I. Thermoplastic Elastomer (TPE) blend (a) Polyolefin

Polyolefins suitable for use in the thermoplastic elastomer blends of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl1-pentene, 5-methyl-1-hexene, mixtures thereof and copolymers thereof with (meth)acrylates and/or vinyl acetates. Preferred, however, are monomers having 3 to 6 carbon atoms, with propylene being preferred. As used in the specification and claims the term polypropylene (PP) includes homopolymers of propylene as well as reactor copolymers of polypropylene which can contain about 1 to about 20 wt % of ethylene or an $\alpha$-olefin comonomer of 4 to 16 carbon atoms, and mixtures thereof. The polypropylene can be highly crystalline isotactic or syndiotactic polypropylene. Commercially available polyolefins may be used in the practice of the invention. Further polyolefins which can be used in terms of the invention are high, low, linear-low, very low density polyethylenes and copolymers of ethylene with (meth)acrylates and/or vinyl acetates.

The amount of polyolefin (a) found to be useful in the thermoplastic elastomer blends is generally from about 10 to about 87 weight percent, under the proviso that the total amount of polyolefin (a) and rubber (b) and functionalized polyolefin (c) is at least about 35 weight percent, based on the total weight of the polyolefin (a), rubber (b), functionalized polyolefin (c) and optional additives (d). Preferably, the polyolefin content will range from about 10 to about 80 percent by weight, based on the total weight of (a)+(b)+(c)+(d).

(b) Olefinic Rubber

Suitable monoolefinic copolymer rubbers (elastomers) comprise non-polar, rubbery copolymers of two or more α-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene and dicyclopentadiene (DCPD).

Butyl rubbers are also useful in the compositions of the invention. As used in the specification and claims, the term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers.

The useful butyl rubber copolymers comprise a major portion of isoolefin and a minor amount, usually less than about 30 wt %, of a conjugated multiolefin. The preferred copolymers comprise about 85–99.5 wt % of a $C_{4-7}$ isoolefin such as isobutylene and 15–0.5 wt % of a multiolefin of 4 to 14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180.

Another suitable copolymer within the scope of the olefinic rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to about 10 wt %. A preferred example is the brominated copolymer of isobutylene and para-methylstyrene. These copolymers are more fully described in U.S. Pat. No. 5,162,445.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore polybutadiene rubber and styrene-butadiene-copolymer rubbers can also be used.

Blends of any of the above olefinic rubbers can be employed, rather than a single olefinic rubber.

Further suitable rubbers are nitrile rubbers. Examples of the nitrile group-containing rubber include a copolymer rubber comprising an ethylenically unsaturated nitrile compound and a conjugated diene. Further, the copolymer rubber may be one in which the conjugated diene units of the copolymer rubber are hydrogenated.

Specific examples of the ethylenically unsaturated nitrile compound include acrylonitrile, α-chloroacrylonitrile, α-fluoroacrylonitrile and methacrylonitrile. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferable.

Especially preferred nitrile rubbers comprise copolymer of 1,3-butadiene and about 10 to about 50 percent of acrylonitrile.

Another suitable rubber in terms of the present invention are based on polychlorinated butadienes such as polychloroprene rubber. These rubbers are commercially available under the trade names Neoprene® and Bayprene®.

In preparing the thermoplastic elastomer blends of the invention, the amount of olefinic rubber (b) generally ranges from about 10 to about 70 weight percent, under the proviso that the total amount of polyolefin (a), rubber (b) and functionalized polyolefin (c) is at least about 35 weight %, based on the weight of the polyolefin (a), the rubber (b), the functionalized polyolefin (c) and the optional additives (d). Preferably, the olefinic rubber content will be in the range of from about 15 to about 40 weight percent.

(c) Functionalized Polyolefin

The polyolefins of the functionalized polyolefins include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being preferred. As used in the specification and claims the term polypropylene includes homopolymers of propylene as well as reactor copolymers of polypropylene which can contain about 1 to about 20 wt % of ethylene or an α-olefin comonomer of 4 to 16 carbon atoms, and mixtures thereof. The polypropylene can be highly crystalline isotactic or syndiotactic polypropylene. Commercially available polyolefins may be used in the practice of the invention. Further polyolefins which can be used in terms of the invention are high, low, linear-low, very low density polyethylenes and copolymers of ethylene with (meth)acrylates and/or vinyl acetates.

The polyolefins of the functionalized polyolefins can be homopolymers of alpha-olefins such as ethylene, propylene, 1-butene, 1-hexene, and 4-methyl-1-pentene, and copolymers of ethylene with one or more alpha-olefins. Preferable among the polyolefins are low-density polyethylene, linear low-density polyethylene, medium- and high-density polyethylene, polypropylene, and propylene-ethylene random or block copolymers.

The functionalized polyolefins contain one or more functional groups which have been incorporated during polymerization. However, they are preferably polymers onto which the functional groups have been grafted. Such functional group-forming monomers are preferably carboxylic acids, dicarboxylic acids or their derivatives such as their anhydrides.

Examples of the unsaturated carboxylic acids, dicarboxylic acids which may be present in the functionalized polyolefin are those having 3 to 20 carbon atoms per molecule such as acrylic acid, methacrylic acid, maleic acid, fumaric acid and itaconic acid.

Unsaturated dicarboxylic acids having 4 to 10 carbon atoms per molecule and anhydrides thereof are especially preferred grafting monomers. These grafting monomers include for example, maleic acid, fumaric acid, itaconic acid, citraconic acid, cyclohex-4-ene-1,2-di-carboxylic acid, bicyclo[2.2.1]hept-5-ene-2,3-dicarboxylic acid, maleic anhydride, itaconic anhydride, citraconic anhydride, allylsuccinic anhydride, 4-methylcyciohex-4-ene-1,2-dicarboxylic anhydride and bicyclo[2.2.1]hept-5-ene-2,3-dicarboxylic anhydride.

Further grafting monomers are epoxy-group containing esters of unsaturated carboxylic acids containing at least 6, preferably 7 carbon atoms. Particularly preferred are glycidyl acrylate and glycidyl methacrylate; other grafting monomers are hydroxy-group containing products such as hydroxy-group containing esters of unsaturated carboxylic acids containing at least 5 carbon atoms such as 2-hydroxyethylmethacrylate, 2-hydroxyethylacrylate, hydroxypropylmethacrylate, hydroxypropylacrylate.

Polyolefins with amine functional groups made by further reaction of polyolefins containing carboxylic acids or their anhydrides groups as well as epoxy groups described above with a polyamine (diamines, triamines, tetramines) derivative such as 3-amino-1-methylaminopropane, piperazine, polyoxyalkyleneamines family (Jeffamine®). Furthermore, the polyolefins can be functionalized with an oxazoline group by using for example 2-(4-vinylphenyl)-4,4-dimethyl-2-oxazoline as grafting monomer.

Various known methods can be used to graft the grafting monomer onto the basic polymer. For example, this can be achieved by heating the polymer and the grafting monomer at high temperatures of from about 150° C. to about 300° C. in the presence or absence of a solvent with or without radical initiator. Another vinyl monomer may be present during the grafting reaction. Suitable radical initiators that may be used include t-butyl hydroperoxide, diisopropylbenzene hydroperoxide, di-t-butyl peroxide, t-butyl cumyl peroxide, acetyl peroxide, benzoyl peroxide, isobutyryl peroxide and methylethylketone peroxide.

In the functionalized polyolefin thus obtained, the graft monomer, preferably the amount of the carboxylic acid or anhydride is preferably about 0.3 to about 10 weight %, more preferably about 0.3 to about 5 weight %, and most preferably at least about 1 weight %, based on the weight of the functionalized polyolefin (c).

The amount of functionalized polyolefin (c) in the thermoplastic elastomer blend is between about 3 to 80% and preferably about 5 to 75 weight %, based on the weight of the polyolefin (a), the rubber (b), the functionalized polyolefin (c) and the optional additives (d) under the proviso that the amount of (a)+(b)+(c) is at least about 35 weight % based on the amount of (a)+(b)+(c)+(d).

(d) Additives

In addition to the polyolefin (a), rubber (b) and functionalized polyolefin (c), thermoplastic elastomer blends of the invention include curatives and may also comprise (d) additives such as reinforcing and non-reinforcing fillers, plasticizers, antioxidants, stabilizers, rubber processing oil, extender oils, lubricants, antiblocking agents, antistatic agents, waxes, foaming agents, pigments, flame retardants and other processing aids known in the rubber compounding art. Such additives can comprise up to about 65 wt % of the total composition of polyolefins (a), rubber (b), functionalized polyolefins (c) and additives (d). Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The type of the oil will be that ordinarily used in conjunction with the specific rubber or rubbers present in the composition.

II. The Substrate

The substrate onto the surface of which adhesion of the thermoplastic elastomer blend is desired is a polyester substrate. The substrate can be in the form of fibers, cords and fabrics or the like. The polyester fibers, cords and fabrics may optionally be epoxy-activated which means that the polyester is treated with an epoxy-derivative such as 1-chloro-2,3-epoxypropane (epichlorohydrine).

In a first step the substrate can be treated with a waterdispersible, blocked di-isocyanate in aqueous dispersion. The blocked di-isocyanates are selected from caprolactam blocked methylene-bis-(4-phenylisocyanate) or 4,4'-methylene-bis-(phenylcarbanilate).

The treatment can be carried out by dipping the substrate into the dispersion containing the blocked di-isocyanate. The dipping time depends on the substrate and can vary from 1 second to 1 hour. After dipping the substrate is dried at a suitable temperature to effect the evaporation of the water. This can be accomplished by drying at a temperature between 100° and 240° C. for 1 to 60 minutes depending on the substrate.

In a second step the treated and dried substrate is then treated with a water-based epoxy resin emulsion in an aqueous emulsion. The epoxy resins are selected from glycerol-poly-glycidylether (e.g. Glycidether 100, a product 30 of Raschig, France), epoxy resin resulting from the reaction between bisphenol A and epichlorohydrin and modified in order to make it water emulsifiable, such as Epikote® DX 258, a product of Shell Chemical or Europox® 756/67W a product of Witco.

As to the treatment and to the conditions of the treatment and the subsequent drying step it is referred to what has been set out above with respect to the treatment of the substrate with the dispersion of the blocked di-isocyanate. Instead of dipping the substrate into the emulsions/dispersions the emulsions/dispersions can also be sprayed onto the surface of the substrate and subsequently dried.

It should be noted that the first and the second step for the treatment of the substrate can be reversed, i.e. the treatment of the substrate with the epoxy resin can be carried out prior to the treatment of the substrate with the blocked diisocyanate. The treatment of the substrate with the blocked di-isocyanate and the epoxy resin can also be carried out in one step, i.e. simultaneously. In this instance only one drying step is required.

The treatment of the substrate can also be carried out using the dispersion of the blocked di-isocyanate alone and applying it as described above.

The final amount of the treatment agent (blocked di-isocyanate and epoxy-resin or blocked di-isocyanate alone) on the treated substrate is about 5% to about 500 grams per $m^2$ of the substrate surface, preferably about 20% to about 100 g/$m^2$.

The dried substrate is then further processed by bonding thereon the modified thermoplastic elastomer under the influence of heat and pressure as described hereinbelow.

III. Processing

The olefin rubber component of the thermoplastic elastomer is generally present as small, i.e. micro-size, particles within a continuous polyolefin matrix, although a co-continuous morphology is also possible depending on the amount of rubber relative to plastic with or without rubber curing, and the cure system or if the rubber is cured, the degree of cure of the rubber. The rubber is desirably partially crosslinked (cured), and preferably fully crosslinked or optionally non-cured. Furthermore, blends of these different types of rubbers can be employed.

The partial or full crosslinking can be achieved by adding an appropriate rubber curative to the blend of polyolefin and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compressing molding. Scrap or flashing can be salvaged and reprocessed.

Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the optimum crosslinking desired. Preferably, after the resin and rubber are intimately mixed, curative is added. Heating and masticating at vulcanization temperatures are generally adequate to complete the vulcanization reaction in a few minutes or less, but if shorter vulcanization times are desired, higher temperatures may be used. A suitable range of vulcanization temperatures is from about the melting temperature of the polyolefin resin (about 120° C. in the case of polyethylene and about 175° C. in the case of polypropylene) to about 250° C. or more; typically, the range is from about 150° C. to about 225° C. A preferred range of vulcanization temperatures is from about 180° C. to about 220° C. To obtain thermoplastic vulcanizates, it is important that mixing continues without interruption until vulcanization occurs. If appreciable curing is allowed after mixing has stopped, a thermoset unprocessable vulcanizate may be obtained.

Any known cure system for the rubber can be used, so long as it is suitable under the vulcanization conditions with the specific olefinic rubber or combination of rubbers being used and with the polyolefin. These curatives include sulfur, sulfur donors, metal oxides, phenolic resin systems, peroxide-based systems and the like, both with and without accelerators and co-agents. Preferably for curing the halobutyl-rubber and the halogenated copolymer of isobutylene and para-methylstyrene are bis-maleimide-based vulcanizing systems, such as n-phenylene bis-maleimide. Such cure systems are well known in the art and literature of vulcanization of elastomers, e.g. from U.S. Pat. No. 3,806,558 and U.S. Pat. No. 5,021,500.

The terms "fully vulcanized" and "completely vulcanized" as used herein means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example from U.S. Pat. Nos. 5,100,947 and 5,157,081.

The thermoplastic elastomer which does not contain the modifier can be made by mixing the rubber with the polyolefin and the optional additives, without any crosslinking agents as described above.

The following general procedure was used in the preparation of thermoplastic elastomer blends of the invention as set forth in the examples. The thermoplastic elastomer and an appropriate portion of the functionalized polyolefin are melt-blended in single or twin screw extruder or conventional internal mixer. The mixture is heated to a temperature sufficient to melt the mixture.

Another way to make the thermoplastic elastomer blend of the invention is by dry-blending of the thermoplastic elastomer with an appropriate portion of the functionalized polyolefin.

Alternatively the functionalized polyolefin (c) is not blended with the thermoplastic elastomer but the functionalized polyolefin is applied to the substrate prior to applying the thermoplastic elastomer blend comprising (a), (b) and optionally (d). The final blend (modified thermoplastic elastomer) is then formed on the substrate.

The modified thermoplastic elastomer of the present invention is used in processes for making shaped articles by conventional processing such as co-injection, co-extrusion, blow-molding, co-blow-molding (injection and extrusion), lamination, calendering, overmolding by injection and compression, and over-extrusion. The thus obtainable shaped article comprises at least one layer of the pre-treated polyester resin having on its surface or part of its surface at least one layer of the thermoplastic elastomer blend according to the invention.

The final excellent adhesion/bonding between the thermoplastic elastomer layer and substrate surface is achieved by melting the thermoplastic elastomer at the surface of substrate using the above mentioned processes.

The melt temperature of the thermoplastic elastomer is in the range of about 170° to about 280° C., preferably about 180° C. to about 260° C. A certain pressure from 1 bar to 200 bars can be applied to the thermoplastic elastomer/substrate system when compression molding or calendering is used to process the thermoplastic elastomer.

The invention will be better understood by reference to the following examples which serve to illustrate but not limit the present invention.

EXAMPLES

1. Materials

Santoprene® rubber (S 201-55, S 101-73, products of Advanced Elastomer Systems Akron, Ohio) is used as thermoplastic elastomer blend (polypropylene/EPDM).

Exxelor® PO 1015 (product of Exxon Chemical) is used as maleated polypropylene and, alternatively MHA-PP, maleated polypropylene with about 1.1% grafted maleic anhydride.

Grilbond® IL6-50% is used as water-based dispersion of Caprolactam blocked methylene-bis-(4-phenylisocyanate) (50% active) (product of EMS Chemie, Switzerland).

Epikote® DX 258 (from Shell Chemical) (75% active), Eurepox® 756/67W (product of Witco) (67% active) are used as water-based emulsion of epoxy resin and glycidether 100 (product of Raschig).

Polyester fabrics used in this investigation were made from poly(ethylene terephthalate) extruded yarns. The yarns can opitionally be epoxy-activated. These fabrics are commonly used for reinforcing of thermoset rubbers.

Gum Tragacanth BP (product of C. E. Roeper, Germany) is used as a wetting agent.

2. Method a) Thermoplastic elastomer blend modification:

Santoprene® rubber was first melt blended in an internal mixer such as a Banbury or a twin screw extruder with a maleic anhydride grafted PP as chemically modified polyolefin at different ratios as showed by Table 1.

b) Polyester fabric dip:

Different water-based dispersions/emulsions were used in this investigation and an excellent adhesion between treated polyester fabric and modified thermoplastic elastomer was obtained in all following cases:

Dipping of polyester fabric first into the blocked di-isocyanate dispersion for 15 seconds (Grilbond® IL6-50%). After drying at 120° C. for 10 minutes the polyester fabric is dipped into the epoxy resin water-based emulsion (e.g. Epikote® DX258) and dried at different temperatures during variable time (Table 2).

Dipping of polyester fabric into a diluted aqueous dispersion of blocked di-isocyanate and diluted aqueous emulsion of an epoxy resin in different dipping orders, different time and under different drying condition temperatures as shown by Table 3.

Dipping of polyester fabric into the water-based dispersion with following composition:

| Ingredients | Weight % |
| --- | --- |
| Glycidylether 100 | 3.26 |
| Gum tragacanth BP (1% water-based emulsion) | 9.61 |
| Grilbond ® IL6–50% | 16.82 |
| Demineralized water | 70.31 |

Table 4 illustrates the dipping conditions and results of adhesion strength.

c) Bonding conditions:

Treated polyester fabric was placed between two injection molded plaques (2.7 mm thickness) of modified Santoprene® rubber. Then the whole system was placed on the plate of a hydraulic press, preheated 1 minute at 220° C. (without pressure), heated 1 minute at 220° C. with a very small pressure (<5 bars) [bar spacers are used to avoid pressure at melt state]. The specimen is then cooled down under a cold press.

d) Adhesion strength:

Adhesion strength is measured on the day after the specimens were prepared in a peel test (according to ASTM D1876-72). It was tried to pull off the thermoplastic elastomer blends from a polyester fabric substrate at 50 mm/minute on a Zwick tensile tester Model 1445. The value is an average of the peeling load in Newton per linear centimeter. Cohesive adhesion is reported when the failure was observed to occur in the thermoplastic elastomer blend.

TABLE 1

Modified thermoplastic elastomer blends composition (weight %)

|  | Example 1 | Example 2 | Example 3 | Example 4 |
| --- | --- | --- | --- | --- |
| S 201-55 | 50 | — | — | — |
| S 101-73 | — | 85 | 90 | 95 |
| Exxelor ® PO 1015 | 50 | — | — | — |
| MHA-PP | — | 15 | 10 | 5 |

TABLE 2

Adhesion strength measured at RT in peel test at 180 degree angle
Polyester fabric was first treated with Grilbond IL6–50% water dispersion for 10 minutes at 120° C.; thereafter it was treated with Epikote ® DX 258 water emulsion.

| Modified thermoplastic elastomer | Drying time (minute) | Drying temperature (°C.) | Peeling force (N/cm) |
| --- | --- | --- | --- |
| Example 1 | 5 | 120 | cohesive* |
| Example 1 | 2 | 150 | cohesive* |
| Example 1 | 2 | 180 | cohesive* |
| Example 1 | 1 | 200 | cohesive* |
| Example 2 | 2 | 150 | cohesive* |
| Example 2 | 2 | 180 | cohesive* |
| Example 2 | 1 | 200 | cohesive* |
| Example 3 | 2 | 150 | cohesive* |
| Example 3 | 1 | 200 | cohesive* |
| Example 4 | 2 | 150 | 29 |
| Example 4 | 1 | 200 | 15 |

*Failure occurred into the thermoplastic elastomer blend

TABLE 3

Dipping conditions and adhesion strength* measured at RT in peel test at 180° angle
The modified thermoplastic elastomer used for the following investigation was the one according to Example 2 (see Table 1).

| First Dip (15 seconds) | | | Second Dip (15 seconds) | | |
| --- | --- | --- | --- | --- | --- |
| Water-based emulsion/dispersion | Drying Time (min) | Drying Temp. (°C.) | Water-based emulsion/dispersion | Drying Time (min) | Drying Temp. (°C.) |
| Grilbond IL6–50% diluted 3 times (16.7% active) | 10 | 120 | Epikote DX258 diluted 3 times (25% active) | 1 | 190 |
| " | 2 | 150 | " | 2 | 180 |
| " | 2 | 180 | " | 2 | 200 |
| " | 2 | 200 | " | 1 | 200 |
| Grilbond IL6–50% (50% active) | 10 | 120 | Epikote DX258 (76% active) | 1 | 190 |
| " | 2 | 150 | " | 2 | 180 |
| " | 2 | 180 | " | 2 | 200 |
| " | 2 | 200 | " | 1 | 200 |

TABLE 3-continued

Dipping conditions and adhesion strength* measured at RT in peel test at 180° angle
The modified thermoplastic elastomer used for the following investigation was the one according to Example 2 (see Table 1).

| First Dip (15 seconds) | | | Second Dip (15 seconds) | | |
|---|---|---|---|---|---|
| Water-based emulsion/dispersion | Drying Time (min) | Drying Temp. (°C.) | Water-based emulsion/dispersion | Drying Time (min) | Drying Temp. (°C.) |
| Epikote DX258 diluted 3 times (25% active) | 10 | 120 | Grilbond IL6-50% diluted 3 times (16.7 active) | 1 | 190 |
| " | 2 | 150 | " | 2 | 180 |
| " | 2 | 180 | " | 2 | 200 |
| " | 2 | 200 | " | 1 | 200 |
| Epikote DX258 (75% active) | 10 | 120 | Grilbond IL-50% (50% active) | 1 | 190 |
| " | 2 | 150 | " | 2 | 180 |
| " | 2 | 180 | " | 2 | 200 |
| " | 2 | 200 | " | 1 | 200 |
| Grilbond IL6-50% diluted 3 times (16.7% active) | 10 | 120 | Eurepox 756/67W diluted 3 times (22% active) | 1 | 190 |
| " | 2 | 150 | " | 2 | 180 |
| " | 2 | 180 | " | 2 | 200 |
| " | 2 | 200 | " | 1 | 200 |
| Grilbond IL6-50% (50% active) | 2 | 150 | Eurepox 756/67W (67% active) | 2 | 180 |
| " | 2 | 180 | " | 2 | 180 |
| " | 2 | 200 | " | 1 | 200 |
| Grilbond IL6-50% diluted 5 times (10% active) | 2 | 200 | Eurepox 756/67W diluted 5 times (13.5% active) | 1 | 200 |
| Grilbond IL6-50% diluted 3 times (16.7% active) | 10 | 120 | none | — | — |

*Peeling force: In all cases the failure occurred into the thermoplastic elastomer

TABLE 4

Adhesion strength* at RT in peel test at 180° angle obtained using one pot dipping

| Modified Thermoplastic Elastomer | One Dip (15 seconds) | |
|---|---|---|
| | Drying time (min) | Drying temperature (°C.) |
| Example 2 (Table 1) | 2 | 170 |

*Peeling force: the failure ocurred into the thermoplastic elastomer

All the Examples according to this invention demonstrate good adhesion, as shown by failure in the TPE component rather than at the bond between the substrate and the TPE.

I claim:

1. A method for adhering thermoplastic elastomer blends to a polyester substrate, said method comprising the steps of:
   (A) treating the polyester substrate with a blocked di-isocyanate in aqueous dispersion and an epoxy resin in aqueous emulsion,
   (B) applying to the treated polyester substrate a thermoplastic elastomer blend comprising
      (a) at least one thermoplastic polyolefin,
      (b) at least one elastomer which has been at least partially cured by dynamic vulcanization in the presence of (a),
      (c) a functionalized polyolefin, and
      (d) optionally additives, then
   (C) bonding the thermoplastic elastomer blend to the polyester substrate at a temperature between about 170° C. and about 280° C. and at a pressure between about 0.1 MPa (1 bar) and about 20 MPa (200 bar).

2. The method of claim 1 wherein the polyester substrate is treated with blocked di-isocyanate prior to, simultaneously with, or after treatment with epoxy resin.

3. The method of claim 1, wherein the thermoplastic elastomer blend comprises
   about 10% to about 87% by weight of the at least one thermoplastic polyolefin (a),
   about 10% to about 70% by weight of the at least one elastomer (b),
   about 3% to about 80% by weight of the functionalized polyolefin (c), and
   up to about 65% by weight of additives (d), with the proviso that the amount of (a)+(b)+(c) is at least 35% by weight, based on the total amount of (a)+(b)+(c)+(d).

4. The method according to any one of claims 1 or 3 wherein in the thermoplastic elastomer blend comprises
   (a) least one thermoplastic polyolefin selected from a homopolymer or copolymer of a $C_{2-7}$ monoolefin monomer or a copolymer thereof with (meth)acrylates and/or vinyl acetates, and
   (b) at least one elastomer selected from the group consisting of EPDM rubber, EPM rubber, butyl rubber, halogenated butyl rubber, copolymers of isomonoolefin and para-alkylstyrene or their halogenated derivatives, natural or synthetic rubber, polyisoprene polybutadiene rubber, styrene-butadiene-copolymer rubbers, nitrile rubbers, polychloroprene rubbers and mixtures thereof.

5. The method according to any one of claims 3 to 4 wherein the functionalized polyolefin is selected from homopolymers or copolymers of $C_2$–$C_7$ monoolefin monomers or copolymers thereof with (meth)acrylates or vinyl acetates having grafted thereon monomers selected from unsaturated carboxylic acids containing 3 to 20 carbon atoms, dicarboxylic acids containing 4 to 10 carbon atoms or their derivatives or their anhydrides provided that they exist, epoxy-group containing esters of unsaturated carboxylic acids containing at least 6 carbon atoms, hydroxy-group containing esters of unsaturated carboxylic acids containing at least 5 carbon atoms, oxazolines, said unsaturated carboxylic acid or unsaturated dicarboxylic acid monomers being further functionalized with polyamines, and mixtures thereof.

6. The method according to any one of claims 1 or 3–5 wherein the content of the graft monomers is between about 0.3% by weight and about 10% by weight, based on the amount of the functionalized polyolefin (c).

7. The method according to any one of claims 1 or 3–6 wherein the amount of functionalized polyolefin (c) in the thermoplastic elastomer blend is between about 5% by weight and about 75% by weight, based on the amount of the thermoplastic elastomer blend.

8. The method according to claim 1 wherein the substrate is selected from a polyester which is optionally epoxy activated.

9. The method according to any one of claims 1 or 3–8 wherein the blocked di-isocyanates are selected from caprolactam blocked methylene-bis-(4-phenylisocyanate or 4,4'-methylene-bis-(phenylcarbanilate).

10. The method according to claim 9 wherein the amount of blocked di-isocyanate or blocked di-isocyanate and epoxy resin on the substrate is from about 5 to about 500 grams per $m^2$ of substrate surface.

11. The method according to any one of claims 1 or 3–10 wherein the epoxy resins are selected from glycerol-polyglycidylether or the reaction-product of bisphenol A and epichlorohydrin.

12. A shaped article comprising a substrate and a thermoplastic elastomer adhering to the surface or part of the surface of said substrate, said shaped article being obtainable by the method as defined in any one of claims 1, 3–11 or 2.

13. The shaped article according to claim 13 wherein the substrate is selected from a polyester fiber, polyester cord and polyester fabric.

* * * * *